UNITED STATES PATENT OFFICE.

LUDWIG ADAM TYC AND LOUIS NAPOLÉON BENJAMIN, OF MONTREAL, QUEBEC, CANADA, ASSIGNORS TO IDEAL CONCRETE, LIMITED, OF MONTREAL, CANADA, A CORPORATION OF CANADA.

METHOD OF MAKING A COMPOSITION OF MATTER FOR MASONRY-WORK.

No. 897,939.      Specification of Letters Patent.      Patented Sept. 8, 1908.

Application filed April 22, 1907. Serial No. 369,680.

*To all whom it may concern:*

Be it known that we, LUDWIG ADAM TYC, a subject of the Czar of Russia, and LOUIS NAPOLÉON BENJAMIN, a citizen of the United States of America, residents of 60 St. Gabriel street, in the city and district of Montreal, in the Province of Quebec, in the Dominion of Canada, have invented certain new and useful Improvements in Methods of Making a Composition of Matter for Masonry-Work, of which the following is a specification.

The invention relates to a new and useful method of making a composition of matter for masonry work, and the object of the invention is to produce a mass, artificially, which in its consistency may be made of different degrees of hardness, varying from the consistency of linoleum to the consistency of granite, and whereby floorings, walls and other parts of buildings may be built up of the manufactured material, either in slabs or one piece, and tiling, flag stones, walks and other structures may be made of a consistency to suit the particular surface to be covered.

In the manufacture of this composition, we take one hundred parts water at a low temperature, say 32° to 40° Fahr., this temperature being necessary to prevent the calcined lime from forming into lumps, as it is known that calcined lime and silicate of potash above 40° Fahr. will form into lumps and thus make the proper mixing of the mortar very difficult. With this water, I dissolve approximately 52 parts (by weight) of magnesium chlorid of anhydrous form, obtained from a tachhydrite composition made up of 2MgCl$_2$, CaCl$_2$, and 12H$_2$O, and to this mixture is added one and one half parts of calcined lime or three parts of magnesium carbonate (magnesite or dolomite not calcined) as the calcined lime absorbs twice the quantity of the water than the said magnesium carbonate. The mixture is then quickly stirred up and while being stirred a prepared mixture is added thereto made up of one part barium chlorid BaCl$_2$, three parts of silicate of potash in powder form, two parts of powdered sulfuric chlorid at five hydrometer. The quantity of the last named mixture is determined by the density required for the liquid cement and for the various purposes it should be at 40 hydrometer of Baumé. The composition of matter is completed by the mixing of inert matters as well as an oxid (magnesium calcined or calcined dolomite) with the liquid cement, the latter in varying proportions according to the form of masonry material required. For instance one part oxid may be used with seventy five parts of inert matters, while the liquid cement already specified may be used from one half part up to twenty parts. The mixture of these materials should be accomplished in a temperature not below 60° Fahr., or if it is not so done the product should be removed instantly where the temperature is not below 60° Fahr. The utility of this temperature may be fully understood, when it is taken into consideration that the heat is very essential in the reaction to render the mortar hydraulic, because if the masonry material is formed in a cool place, the compound never heats up and therefore the silicate of potash would be powerless to transform the excess of magnesium chlorid into magnesium silicate contained in the oxychlorid formed, and thus transform itself into potassium chlorid and be set free as is necessary in this composition. In the re-action of the composition, the block or the molded material gradually attains a heat by itself as high as 300 to 350 Fahr., and thus the sulfur chlorid is transformed into hydrochloric acid and in the further reaction, the silicate of potash transforms the stone into silicate of magnesium and the potash is freed.

What we claim as our invention is:

1. In the herein described method of making a composition of matter for masonry work, the mixture of a liquid cement by dissolving in water at a low temperature, approximately 32° to 40° Fahr., a magnesium chlorid of anhydrous form, obtained from a tachhydrite composition made up of 2MgCl$_2$, CaCl$_2$, and 12H$_2$O, and adding to this dissolved matter one and one half parts of calcined lime and quickly stirring said mixture and adding thereto a mixture separately prepared, composed of one part barium chlorid, BaCl$_2$, three parts silicate of potash in powder form and two parts of sulfuric chlorid at 5 hydrometer, this latter mixture being poured in during the said stirring, in quantities determined by the density required, then taking a quantity of inert matters and an oxid and mixing said inert matters, oxid and liquid cement thoroughly together in suitable quantities and finally letting the mixture so made set in a temperature at an approximate minimum of 60° Fahr.

2. In the herein described method of making a composition of matter for masonry work, the mixture of a liquid cement by dissolving in water at a low temperature, approximately 32° to 40° Fahr., a magnesium chlorid of anhydrous form, obtained from a tachhydrite composition made up of $2MgCl_2$, $CaCl_2$, and $12H_2O$, and adding to this dissolved matter three parts magnesite or dolomite not calcined and quickly stirring said mixture and adding thereto a mixture separately prepared, composed of one part barium chlorid, $BaCl_2$, three parts silicate of potash in powder form and two parts of sulfuric chlorid at 5 hydrometer, this latter mixture being poured in during the said stirring, in quantities determined by the density required, then taking a quantity of inert matters and an oxid and mixing said inert matters, oxid and liquid cement thoroughly together in suitable quantities and finally letting the mixture so made set in a temperature at an approximate minimum of 60° Fahr.

Signed at the city and district of Montreal, in the Province of Quebec, in the Dominion of Canada, this 20th day of April, 1907.

LUDWIG ADAM TYC.
LOUIS NAPOLÉON BENJAMIN.

Witnesses:
G. H. TRESIDDER,
D. W. COLTON.